United States Patent
Budiyono

(10) Patent No.: US 12,259,562 B2
(45) Date of Patent: Mar. 25, 2025

(54) METALENS BEAM SPLITTER HAVING FRUSTRUM CUT PYRAMID STRUCTURES

(71) Applicant: LoDel Designs, Inc., Los Angeles, CA (US)

(72) Inventor: Fadel Budiyono, Los Angeles, CA (US)

(73) Assignee: LoDel Designs, Inc., Los Angeles, CA (US)

( * ) Notice: Subject to any disclaimer, the term of this patent is extended or adjusted under 35 U.S.C. 154(b) by 0 days.

(21) Appl. No.: 18/780,819

(22) Filed: Jul. 23, 2024

(65) Prior Publication Data

US 2025/0035945 A1     Jan. 30, 2025

Related U.S. Application Data

(60) Provisional application No. 63/515,257, filed on Jul. 24, 2023.

(51) Int. Cl.
G02B 1/00 (2006.01)
G02B 1/11 (2015.01)
G02B 27/10 (2006.01)

(52) U.S. Cl.
CPC ......... *G02B 27/1086* (2013.01); *G02B 1/002* (2013.01); *G02B 1/11* (2013.01)

(58) Field of Classification Search
CPC .......... G02B 1/002; G02B 1/11; G02B 1/118; G02B 3/0006; G02B 3/0012; G02B 3/0037; G02B 3/0056; G02B 3/0075; G02B 2003/0093; G02B 5/045; G02B 27/1073; G02B 27/108; G02B 27/12; G02B 27/123; G02B 27/126
See application file for complete search history.

(56) References Cited

U.S. PATENT DOCUMENTS

| | | |
|---|---|---|
| 2001/0017320 A1 | 8/2001 | Knowles et al. |
| 2007/0242334 A1 | 10/2007 | Selbrede et al. |
| 2018/0011564 A1* | 1/2018 | Aurongzeb ............. B32B 17/06 |
| 2021/0389506 A1* | 12/2021 | Ang ...................... G02B 17/006 |
| 2022/0050294 A1* | 2/2022 | Fermigier .............. G02B 5/008 |
| 2022/0086988 A1 | 3/2022 | Coleman |

FOREIGN PATENT DOCUMENTS

CN     108594340 A  *  9/2018

OTHER PUBLICATIONS

International Search Report and Written Opinion, issued Oct. 9, 2024, in corresponding PCT Application No. PCT/US2024/039160.

* cited by examiner

*Primary Examiner* — Ryan S Dunning
(74) *Attorney, Agent, or Firm* — Venable LLP; Ryan T. Ward

(57) ABSTRACT

A lens for manipulating electromagnetic waves including a substrate a first zone on a surface of the substrate, the first zone being configured to manipulate a first wavelength range, wherein the first zone comprises at least one Frustrum cut pyramid structure each having a first set of dimensions that are defined based on the first wavelength range.

18 Claims, 9 Drawing Sheets

Pyramid Dimensions

Pyramid Dimensions

METALENS BEAM SPLITTER HAVING FRUSTRUM CUT PYRAMID STRUCTURES

CROSS REFERENCE

This application claims priority to U.S. provisional patent application No. 63/515,257, filed Jul. 24, 2023, the contents of which are incorporated herein in their entirety.

BACKGROUND

Traditional lenses that are widely used in the solar energy market today are convex in shape and made of glass. The lenses are deliberately curved to slow down the incident light rays. The intensity of which this incident occurs is strongest in the center and slowly decreases as it approaches the edge in which the lens is at its thinnest. The process in which the light is slowed down results in the refraction of light. The wavelengths are harnessed by structures that operate in a nanoscale range where both the wave and the structure are able to interact and have an impact on each other. The parallel incident rays are then brought to a single focus point on the other side of the lens.

Metalenses are lenses which can manipulate multiple wavelength ranges of the electromagnetic spectrum. When tailored to specific wavelengths, a metalens can manipulate visible light and replace traditional lenses within optical instruments. A metalens may perform functions of a regular lens in a more compact form, which can change the overall design of an instrument such as a camera making it more efficient both in form and function.

SUMMARY

Additional features and advantages of the disclosure will be set forth in the description that follows, and in part will be understood from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

A lens for performing the concepts disclosed herein can include: substrate; and a first zone on a surface of the substrate, the first zone being configured to manipulate a first wavelength range, wherein the first zone comprises at least one Frustrum cut pyramid structure each having a first set of dimensions that are defined based on the first wavelength range.

DETAILED DESCRIPTION

Some embodiments of the disclosure are discussed in detail below. In describing embodiments, specific terminology is employed for the sake of clarity. However, the disclosure is not intended to be limited to the specific terminology so selected. A person skilled in the relevant art will recognize that other equivalent components can be employed, and other methods developed, without departing from the broad concepts of the disclosure. All references cited anywhere in this specification, including the Background and Detailed Description sections, are incorporated by reference as if each had been individually incorporated.

Figures 1A, 1B:
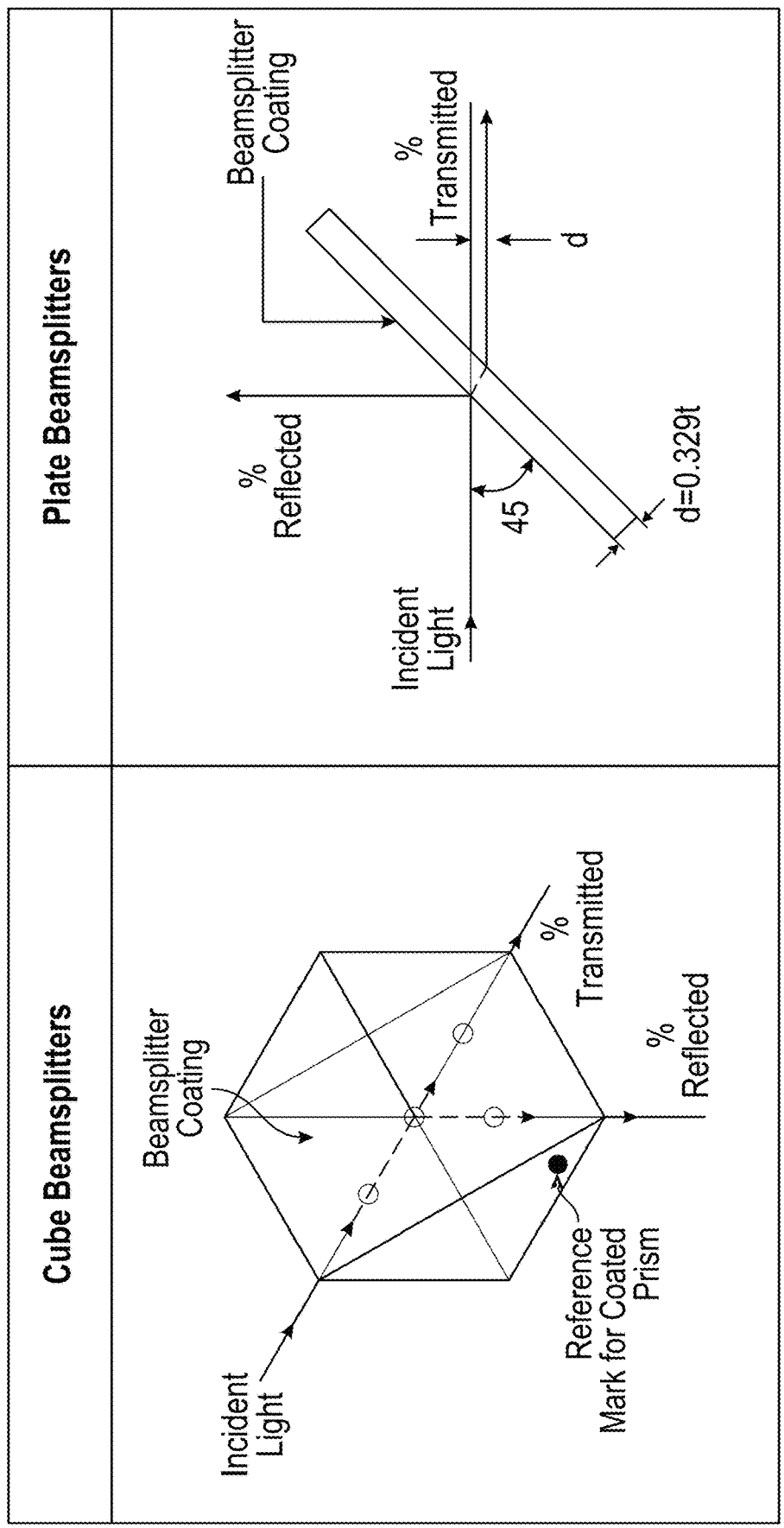
FIG. 1A illustrates an example of a cube beamsplitter.
FIG. 1B illustrates an example of a plate beamspitter.

A "beam splitter" as disclosed herein can include a component in an optical system which can split a single beam of light into two or more beams at a designated ratio. A beam splitter is also able to collect light of different wavelengths with different powers, polarizations, and wavelengths. Beam splitters are photonic devices with wide applications in optical communication, interferometers, and spectroscopy. Common beam splitter types include cube beam splitters and plate beam splitters. A cube beam splitter may be created by joining together two trigonal prisms, and the device's functionality can be controlled by manipulating the interface's properties. A plate beam splitter is a flat lens typically made from glass and finished with a layer of coating on the side that receives the incident light ray. FIGS. 1A and 1B illustrate the inner and outer working of both types of splitters, as well as the geometry of each respective type.

As shown in FIG. 1A and FIG. 1B, each type of beam splitter may include certain design and layers as to where the coating is placed, to accommodate different functionality requirements. Cube beam splitters, such as that illustrated in FIG. 1A, may utilize different manufacturing processes and materials, with this type of beam splitter typically requiring a layer of cement to function. The benefits of cube beam splitters may include higher performance capability and may be used in optical instruments that receive high intensity of light and require accuracy within its design. A flat plate beam splitter, such as that illustrated in FIG. 1B, is a cheaper alternative that is more compact in size and geometrical shape.

Beam splitters, as previously mentioned, allow incident rays of light to be split. In the field of optical technology, beam splitters may allow two different optical instruments to capture and process light. Such instruments include, but are not limited to, microscopes, telescopes, and digital cameras. For example, high functioning cameras such as that of the Hubble telescope and other satellites utilize beam splitters.

Commercial products such as cameras also utilize beam splitters. One popular camera type is the Single Lens Reflect (SLR) camera. The mechanism behind an SLR camera is, as the name suggests, a single lens that reflects a portion of the incident light to a viewfinder which is where the photographer's eye is placed to preview the image that is about to be captured. A digital SLR (DSLR) captures images and stores them in a binary form instead of on film, being completely digital. However, both SLRs and DSLRs typically use a beam splitter to split light. The beam splitter is typically a piece of glass inside of the camera.

A "metamaterial" is a type of material engineered to have a property that is rarely observed in naturally occurring materials. With respect to metalenses, a metalens may be constructed using a metamaterial having artificially structured materials that are geometrically shaped in a nanometric scale, with the result allowing for a metalens capable of manipulating a range of various wavelengths across the electromagnetic spectrum. The specific properties of a metamaterial are derived from the inherent raw material it was made of and the geometrical arrangement. Due to its adjustable range of wavelengths, metamaterials can also manipulate acoustics, heat, microwaves, ultraviolet, and potential additional ranges of the electromagnetic spectrum, X ray and Gamma ray.

Metamaterials can include electromagnetic metamaterials, acoustic metamaterials, thermal metamaterials, and mechanical metamaterials. The geometric structure of the metamaterial is what gives functionality to the surface of the metamaterial (also referred to as a "metasurface"). The geometric structure may contribute more to the functionality than the material of which the metamaterial is made. The responses and functionality of a metamaterial with artificial microscopic manipulation enable metamaterials to react to electromagnetic waves in ways that naturally occurring materials cannot. For example, these manipulations of waves include but are not limited to wave phase modulation, polarization control, perfect absorption, wave focusing and holography. Metamaterials have also shown the ability to reduce the size and weight of a lens. This may be advantageous as many devices are unavoidably bulky due to their optical components.

The fabrication of metasurfaces can be expensive and time consuming. Recent fabrication methods may reduce cost. In some example approaches, a glass coating is applied to a polymer substrate, then the polymer goes through an electron lithography process where the desired structure of the gradient is formed on the polymer's surface. The structure at the nanoscale determines the practicality of the metasurface, and the structure may be optimized to accommodate blue, red, and green wavelengths.

A metalens configured as described herein provides increased durability with respect to high temperature and exposure to debris than previous metalenses, making it ideal for usage in the solar industry or other industries having ruggedized requirements. Preferably, the metalens utilizes a pyramid shaped design with a frustum cut added into the geometric shape (which is a cube with vertices of 200 nm). The pyramid shaped structures are preferably placed at equal distances to one another (e.g., 200 nm), with the distribution of such structures helping determine the bandwidth that the material manipulates. The pyramid shaped structures themselves can, for example, be made out of SU-8 (a high contrast, epoxy-based negative photoresist) or polymethyl methacrylate (PMMA) (a synthetic resin produced from the polymerization of methyl methacrylate, often used as a substitute for glass in products such as shatterproof windows, skylights, and aircraft canopies, and often used in the nanotechnology sector). The individual structures can be made out of either SU-8 or PMMA on top of a substrate (such as, but not limited to glass or any polymer). In some configurations (e.g., medical applications), the structures may instead be made from a polymer which is compatible with the human body and/or medical use.

In some configurations, the shape of the structure being placed on the substrate can be a cube, rectangle, cylinder, or other geometric shape. In such configurations, the structure could be a Frustrum cut (e.g., a Frustrum cut cylinder, etc.).

Dispersion of the structures over the substrate can vary depending on the wavelength of light being interacted with. The height of the structures can likewise vary and, coupled with dispersion, can change the wavelengths being interacted with.

In some configurations, the base material could be made out of glass or other materials. In some configurations, the structures can be configured to redirect (e.g., reflect) the light being interacted with.

In some configurations, a metalens may include a flat lens whose surface has been modified geometrically on a nanometer scale. For example, the geometric structure of a lens can be arranged such that the structure at the center of the lens slows down the light passing through the center more than the structure at the edges, thereby bringing the light to focus. In terms of capability, metalenses can control multiple parameters of a light beam, including but not limited to polarization, phase, and amplitude.

As an example, through deliberate design and precision in manufacturing, a metalens may be able to perform the same function as a beam splitter with additional practicality and efficiency. A metalens may be as thin as paper or foil, and much like glass itself, is not necessarily flat in geometry or surface geometry. A metalens may possess a geometrical shape that may be precisely manufactured on a nanometric scale and may be even smoother than glass.

The functionality and practicality of a metalens may be primarily determined by the geometrical shape of the gradient surface itself, more so than the raw material of which it is composed. The raw material may affect to the metalens's capability to withstand certain conditions and its ability to handle different electrical phenomena involved in the electromagnetic spectrum. The gradient surface may determine what scientists refer to as the wavelength bandwidth in which it operates. Visible light is a section of the electromagnetic spectrum that the human eye operates in, commonly defined as between 380 nm to 750 nm. An average camera (e.g., using a glass lens) cannot fully cover the full bandwidth of visible light. The functionality and practicality of a metalens lies within the tailoring of the nanostructures within its gradient surface to accommodate a wavelength bandwidth that may be required for any specific application.

The wavelength bandwidth of a metalens determines the desired part of the electromagnetic spectrum in which it operates. For instance, the visible light spectrum in which human eyes operate in, ranges from 380-750 nm. The average camera is not able to capture the full extent of the visible light spectrum itself. However, there are cameras designed to capture the full extent of the visible light spectrum, called Full Spectrum Cameras. A metalens may be engineered in some configurations to mimic that of a full spectrum camera with similar efficiency and a fraction of the price. This is achieved by the arrangement of wavelengths according to the arrangement of increments on the gradient.

The capability of a metalens may be determined by the bandwidth of the gradient surface. In some configurations, the operating bandwidth is determined by the nanostructures formed on the material's surface. For example, in some configurations, a metalens design has multiple zones of nanostructures on the surface of a substrate material. In certain configurations, the zones are concentric rings, each ring being designed to manipulate a certain wavelength or wavelength range. From the centermost ring to the outermost that covers the rim, each ring represents a specific wavelength or wavelength range. For practical purposes, to cover a larger bandwidth, each ring may have different wavelengths based off increments of said wavelengths and can vary depending on different applications.

As previously mentioned, the functionality of a metalens is heavily determined by the geometry of the nanostructures that are constructed on the surface. The focus of the design of some configurations is the manipulation of the bandwidth that governs the operating range of the metalens. In some configurations, the optimization of wavelengths is based on the colors of common objects captured by cameras. For instance, the wavelength that the hue of blue occupies is roughly within the range of 450 nm to 485 nm, the hue of green in which the color of plants and other assortments of objects are ranged within 500 nm to 550 nm, violet and indigo, colors that are least found in objects are within the range of 380 nm to 420 nm. When designed properly in a system of increments to accommodate the ranges of wavelengths listed above, some configurations provide a metalens that is able to operate similarly to a conventional glass with similar or a higher rate of efficiency.

In some configurations, the nanostructure may be determined by using a particular formula that is commonly referred to as the Ideal Phase Distribution formula:

$$\theta = -\frac{2\pi}{\lambda}\left(\sqrt{x^2 + y^2 + \phi^{\wedge}2} - \phi^2\right). \tag{1}$$

In this equation, the following variables are used:
x,y—Spatial Coordinate
ϕ—focal point
λ—wavelength In some configurations, the functionality of a metalens may be determined by the geometry of the nanostructures and/or the dimensions of the specific nanostructure. Establishing the dimensions of the metalens may create specific outcomes on certain parameters such as optical transmission and phase shift ratio. The height of a nanostructure may be heavily determined by the desired optical properties and the design requirements. In certain cases, there may not be a particular mathematical formula that governs the exact height and dimension of the nanostructure. Such parameters may require advanced modelling and software simulations to be identified and optimized. However, it is possible in some configurations to determine the structure by providing specific parameters to a simulation, such as desired focal point, specific wavelength manipulated, and material properties.

In some configurations, some parameters are more significant to the efficiency of the metalens than others. As written in Equation (1) above, the focal point and the wavelength bandwidth are variables in the ideal phase distribution formula. The ideal phase distribution formula provides a specific index that may be able to determine the rate of efficiency of the metalens itself, and may theoretically determine the success of the constructed structure when interacting with light.

The x and y variables within Equation (1) refer to the two-dimensional position that in the optical element. These are specific coordinates where the phase distribution occurs, and may be represented in units of micrometers or nanometers depending on the desired precision.

In some configurations, the optical properties of the metasurfaces may be determined by the length and height of each individual structure. As a result, the overall volume of the nanostructures and the proximity between structures may play a role in how they react to incident light rays. To simplify, however, instead of the volume of the nanostructure, a focus may be placed on the relationship between the width/length of its sides and the height of the structure. These variables of width, length, and height may determine the volume of the structure and the ability to absorb the wavelengths.

In some configurations, the transmittance ratio is a crucial parameter that determines the resolution of the image that will be produced. The transmittance ratio is the ability of the material to absorb the image itself.

In some configurations, based on simulations and calculations, one ideal shape for intake is a pyramid. A pyramid shape can store matter in a highly efficient manner, as a pyramid has the ergonomics of a cone and the maximum volume capacity of a square without interference with the waves. When combined with other parameters such as proximity between structures and the ideal material, it may be shown that in some configurations, the transmittance ratio of a pyramid structure may reach 100% capacity, which is the transmittance ratio of glass. In other words, the incident ray of light that hits the material is equal to the transmitted light that passes through the material. In other words, the light that is absorbed by the material is as much light as is available within the environment that the material is in.

Figure 2:
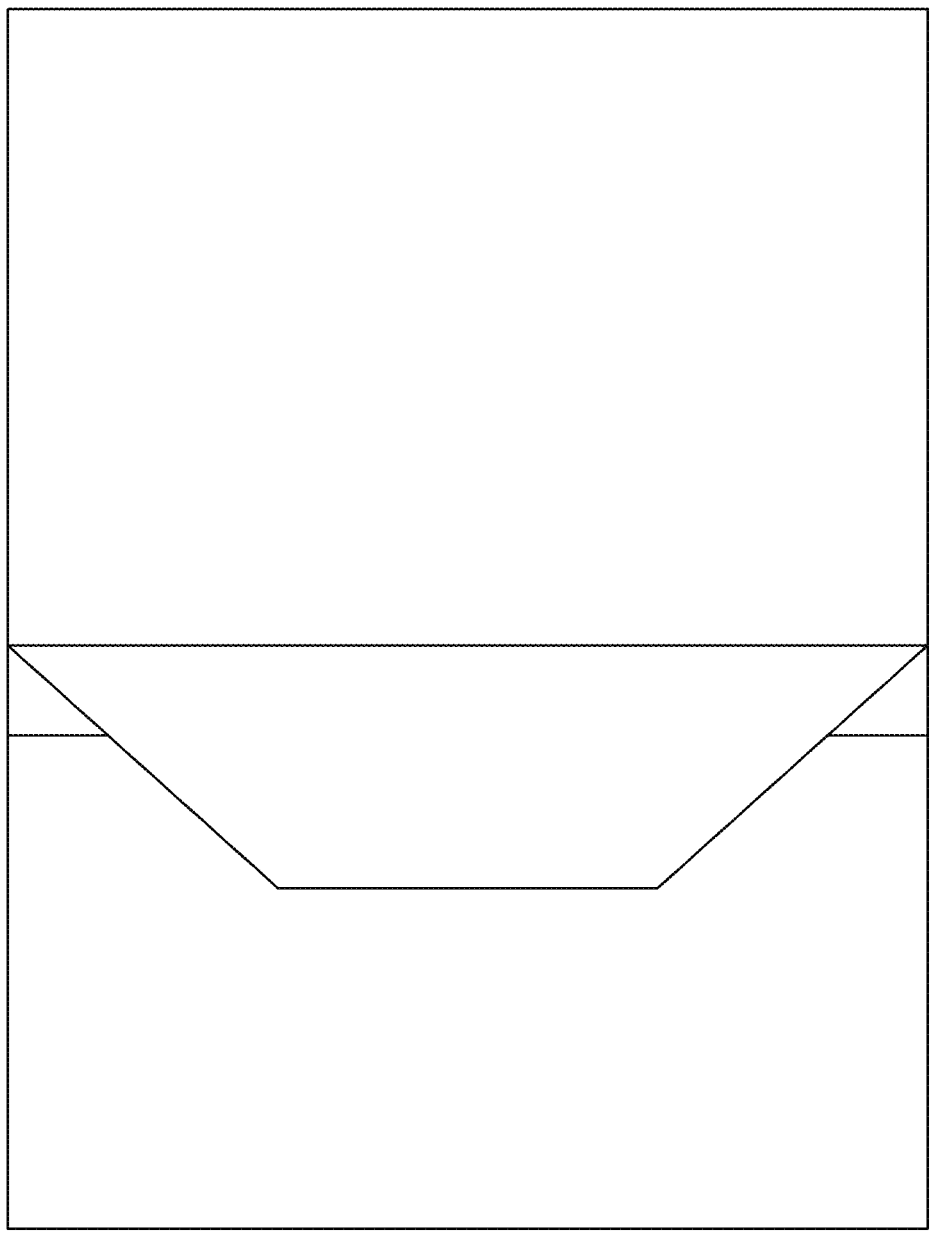
FIG. 2 illustrates an exemplary pyramid with a frustum cut.

Other geometrical shapes may be used in some configurations. These shapes include, but are not limited to, square pillars and cylinders. For example, pillars have an advantage in having a high intake rate of light waves. In some instances, certain phenomena such as interference and resistivity of the flow may arise. Cylinders possess similar features to that of a pillar with a circle as a base, having a smoother motion of light waves entering the material. However, the ability of a cylindrical structure to store light waves may be less than that of a square pillar. In some configurations, a shape is preferred with a flat surface and greater in volume than a pillar or cylinder. For example, some configurations use a pyramid with a frustum cut, as shown in FIG. 2.

The volume of a Frustum cut Pyramid is given by Equation (2):

$$V = \frac{h}{3}*\left(A1 + A2 + \sqrt{(A1 \cdot A2)}\right) \tag{2}$$

When compared and calculated to that of a frustum volume of a cylinder or a cone as a reference, the overall volume of a cut pyramid may be much greater. In some configurations, the pyramid may possess all the features and ergonomics of a pillar or cylinder.

In some configurations, the overall positioning of nanostructures may be clustered into repeating units. For example, in some configurations, a unit may be a subdivision of five pyramid structures or any other suitable number of pyramid structures. Inside this subdivision, the pyramids are positioned on each individual corner of a square with an additional pyramid in the center of the square. This arrangement of pyramid structures into repeating units may optimally utilize the space on the surface of the metalens. Other geometric shapes may also be used in repeating units, such as the five-structure arrangement described above, or other repeating arrangements.

In various configurations base shapes for repeating units may include, but are not limited to, triangles, squares, pentagons, hexagons, polygons, and/or irregular tiles, with nanostructures places at corners, vertices, and central areas thereof. An advantage of using repeating unit patterns is to improve regulation of light waves whilst also reducing or even minimizing the amount of interference and anomalies that occur. For example, in the example of the five-pyramid unit described above, the pyramid in the center of the square may act as a supporting structure to the pyramids positioned in the corners of the square, that captures extra waves that may naturally bounce off due to natural or unpredicted reflection.

Figure 3:
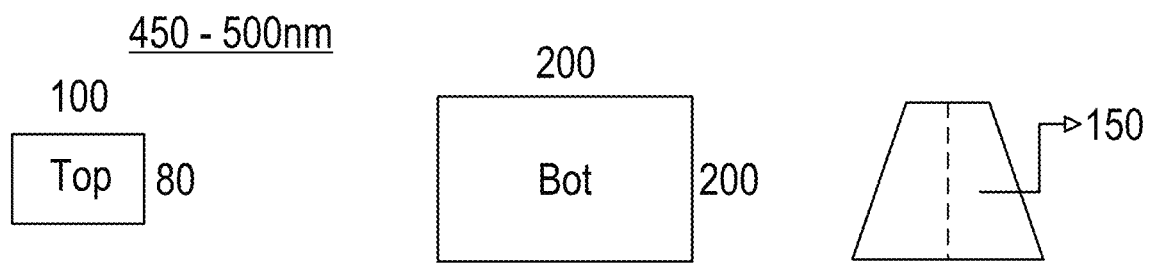
FIG. 3 illustrates a first example of a five pyramid unit.
Figure 3:
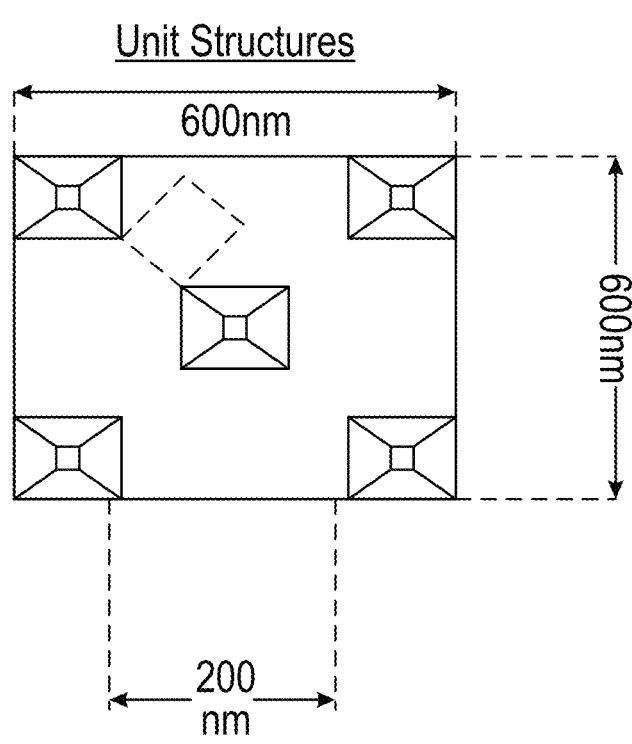
Figure 3:
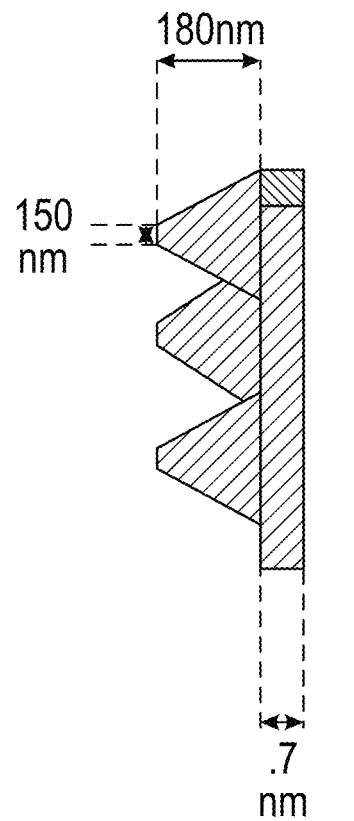
Figure 4:
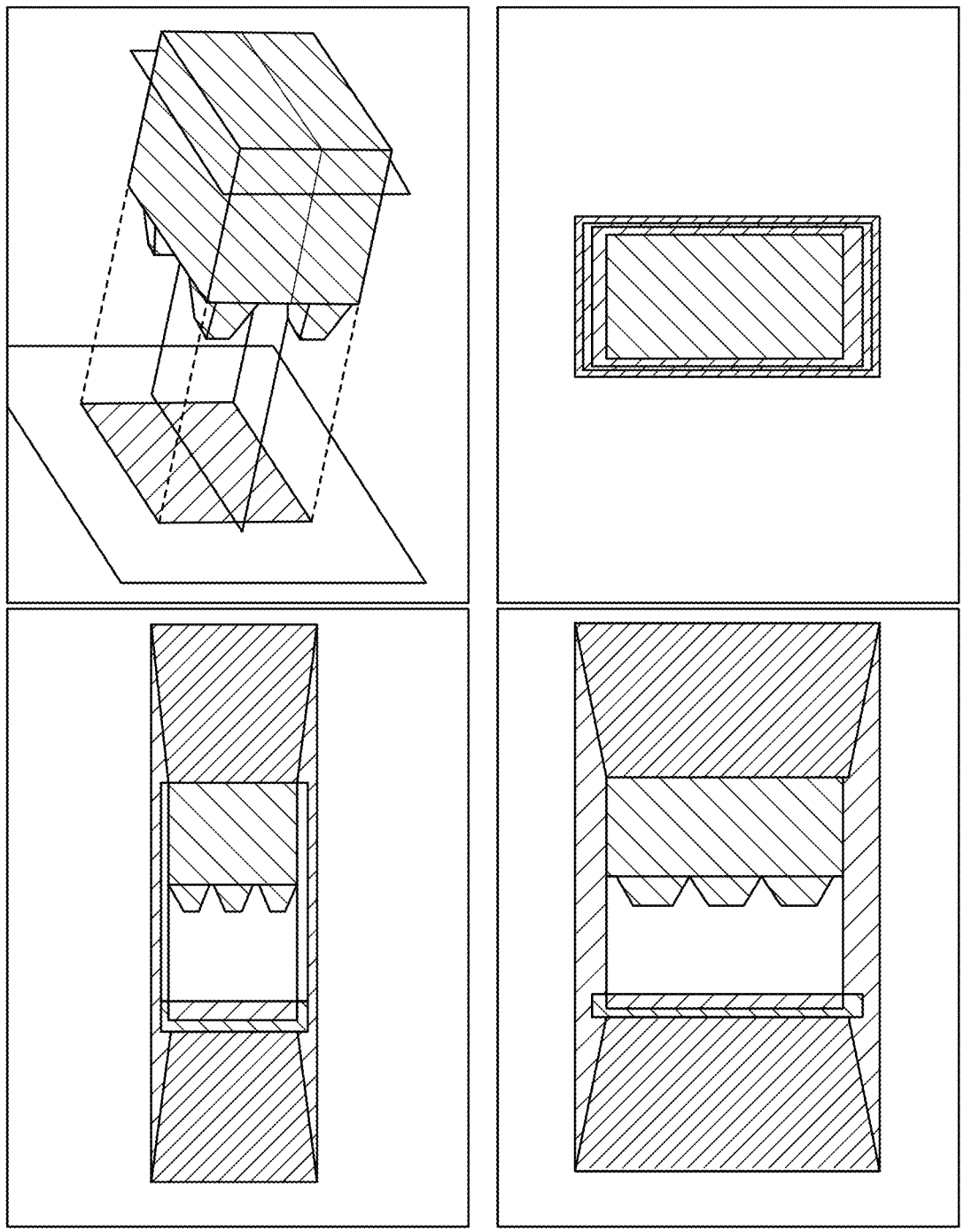
FIG. 4 illustrates a second example of a five pyramid unit.

An example of a five-pyramid unit of some configurations is shown in FIG. 3 and FIG. 4.

Figure 5:
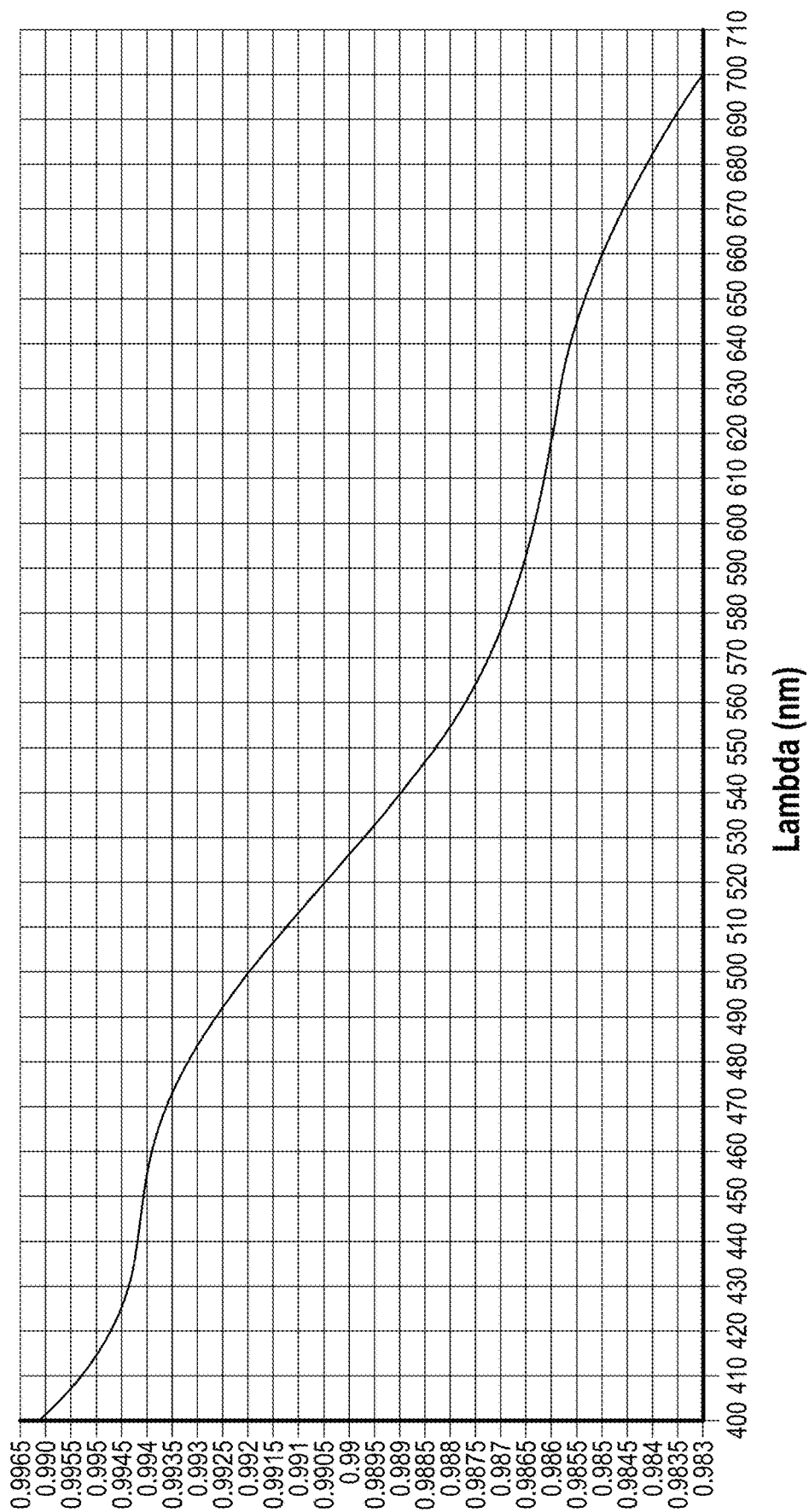
FIG. 5 illustrates an example calculation of a transmittance ratio of a frustum-cut pyramid design.
Figure 6:
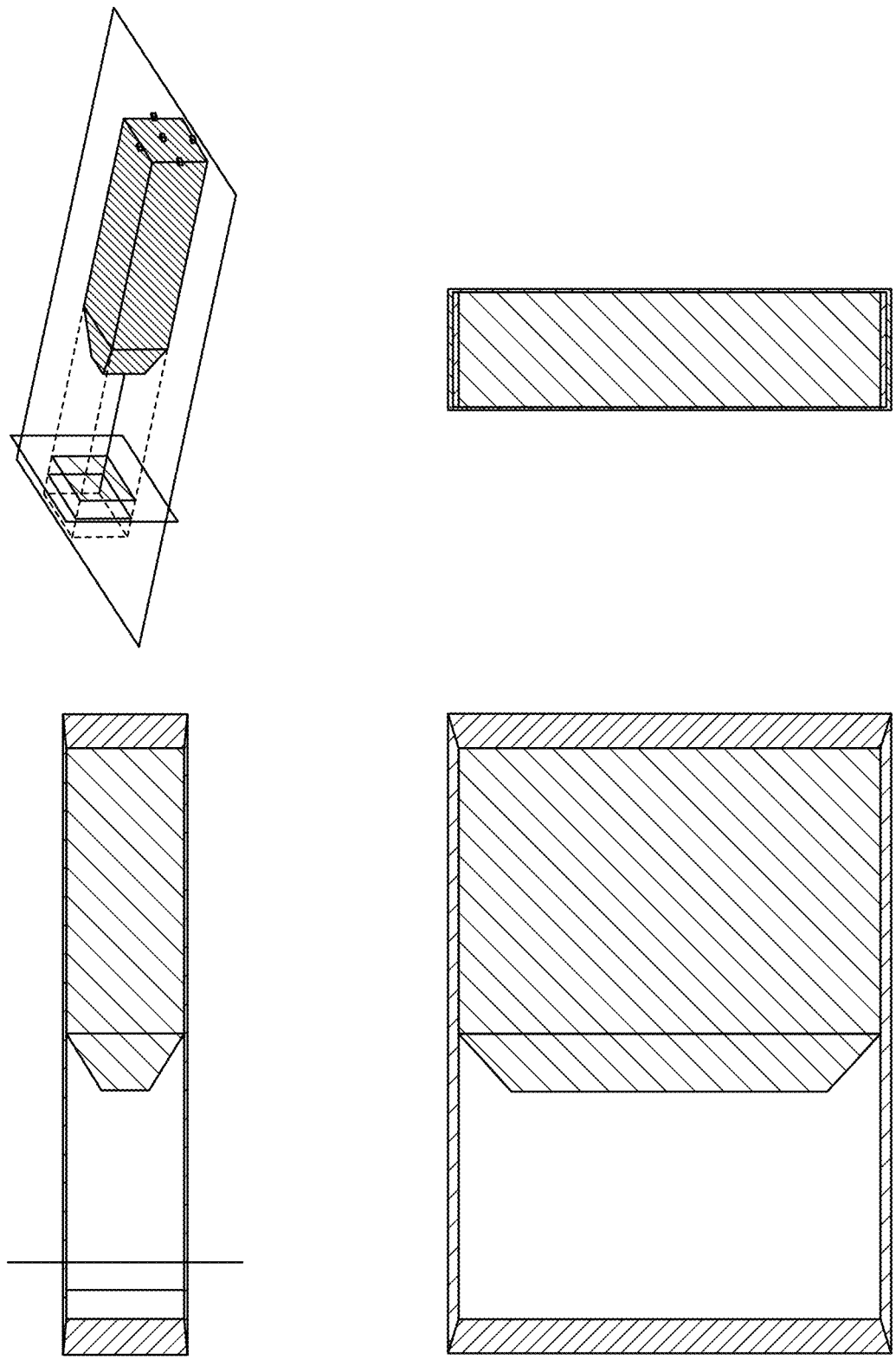
FIG. 6 illustrates an example of a single frustum cut pyramid.

A calculation of the transmittance ratio of a frustum-cut pyramid design of some configurations is shown in FIG. 5, with an example of a singular frustum-cut pyramid illustrated in FIG. 6. In this example, the highest threshold is 0.996, which is equivalent to 99.6% of transmittance ratio. Though the graph declines in value, the emphasis should, however, be placed on the lower end of the visible spectrum, as it currently operates at an approximated level of 100% transmittance ratio with a slight consistent decay at 99.6% on the far end of the spectrum. This indicates that the technology has the capability to absorb more than light and colors that are in closer proximity to the ultraviolet spectrum. The slight decay in transmittance ratio to 98.3% is still significantly higher than the average glass in the market.

The material chosen may also affect the efficiency of the technology. Some configurations use a material named Borofloat® 33 (Schott AG, Mainz, Germany) which is a type of borosilicate glass that is made by combining Boron and Silica. A notable feature of this material is that it has weak fluorescent intensities, which means it is capable and will function optimally on wavelengths that are closer to the UV spectrum. In addition, Borofloat® 33 is equipped with an Anti-Reflective coating which is ideal for transmitting light as it encourages light to pass through the material instead of reflecting it. In terms of durability, Borofloat® 33 is six times stronger than glass, having a Young's modulus of 64 kN/mm$^2$, whereas glass has a Young's modulus of 10 kN/mm$^2$, and can remain in ideal form up to 450 degrees Celsius. Other materials, including other borosilicate glass materials, may be used in other configurations.

By structuring the order of each individual structure, grouping the structures may make the manufacturing process and design easier. So instead of meticulously placing each structure, each individual unit of structure may be placed and positioned. By doing so, a higher rate of overall transmission ratio average throughout the design may be achieved. In some configurations, the proximity between structures must be smaller than that of the smallest wavelength to be manipulated. In the example above, the unit structure operates exceptionally in the 500-700 nm wavelength bandwidth, with a transmittance ratio at that bandwidth from 98.6% to 99%. The design is adjusted to different wavelengths to be manipulated.

Figure 7A:
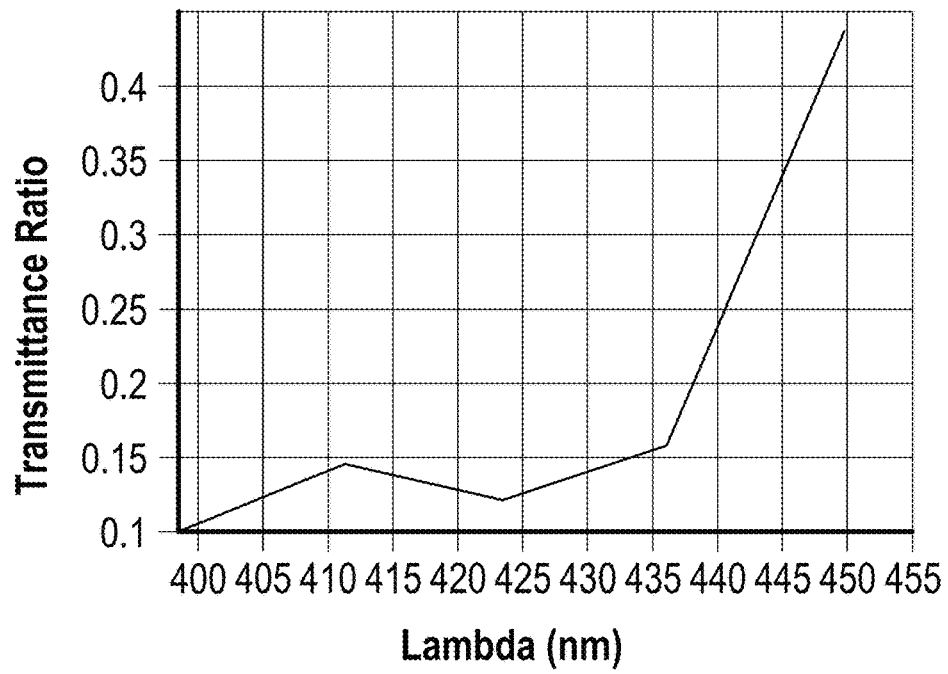
FIG. 7A illustrates an example of transmittance ratio on a single frustum cut pyramid between 400 nm to 450 nm.
Figure 7B:
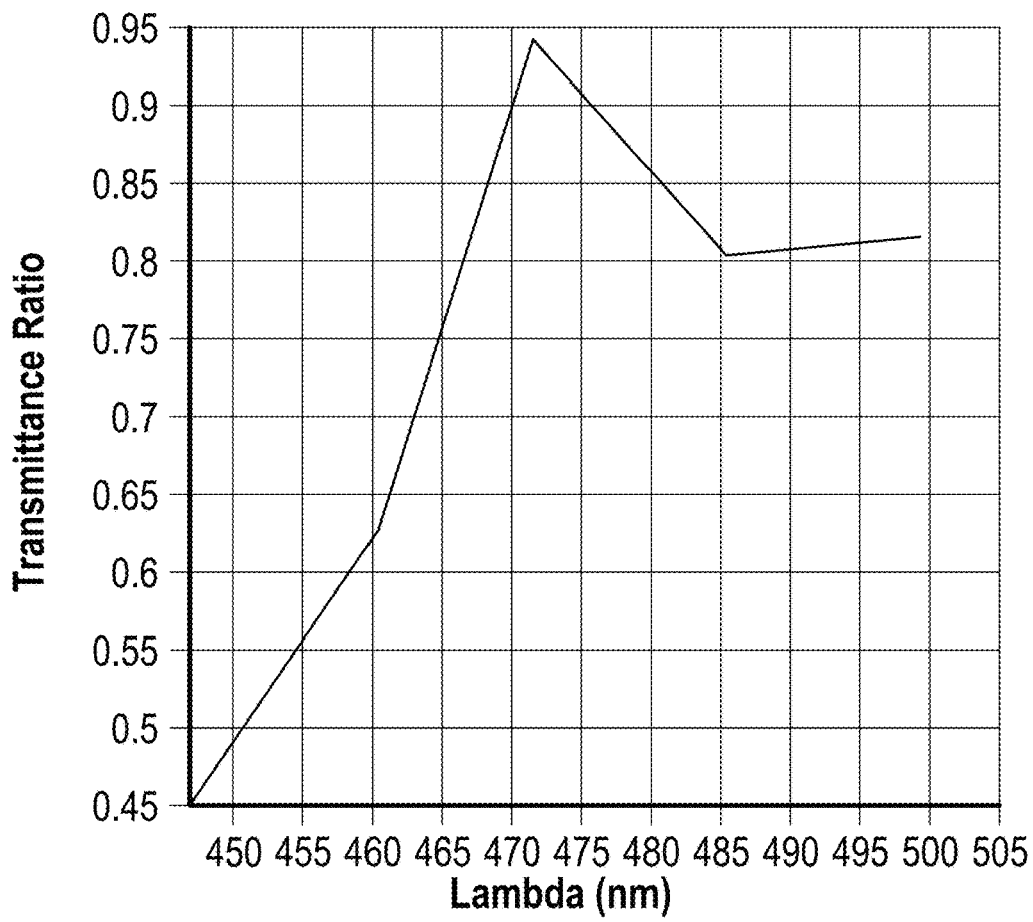
FIG. 7B illustrates an example of transmittance ratio on a single frustum cut pyramid between 450 nm to 500 nm.

FIGS. 7A and 7B show an example of 400-500 nanometers bandwidth being applied to a singular pyramid structure, with the Y-axis illustrating the transmittance ratio (i.e., the percentage of light which hits the structure and which is transmitted to the substrate). FIG. 7A shows an example from 400 nanometers to 450 nanometers, and FIG. 7B shows an example from 450 nanometers to 500 nanometers.

Figure 8:
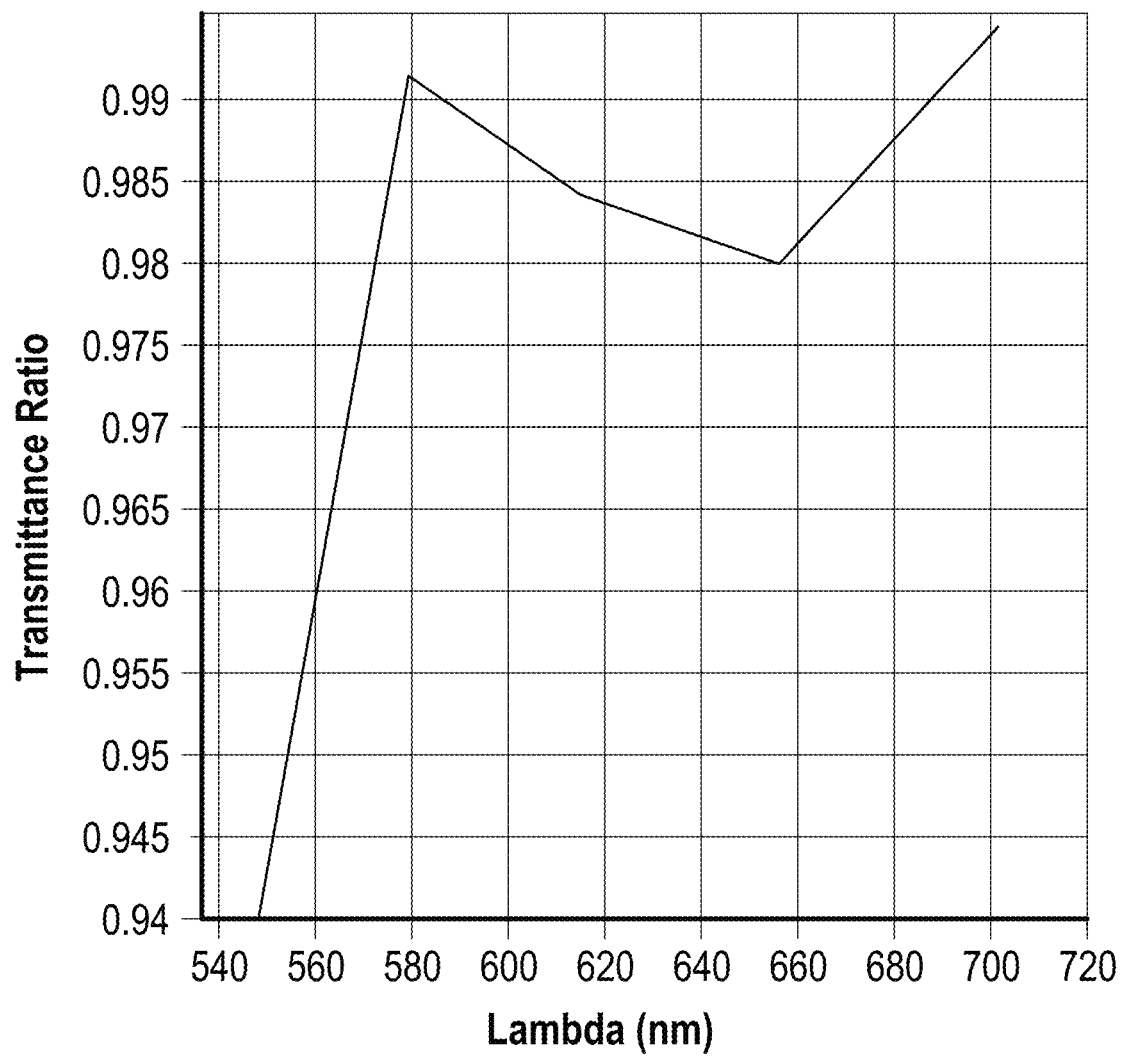
FIG. 8 illustrates an example of transmittance ratio on a single frustum cut pyramid between 550 nm to 700 nm.

FIG. 8 shows an example of light transmittance for singular pyramid structures as disclosed herein for light having 550-700 nanometers bandwidth.

The 400-480 nanometer bandwidth range occupies the colors violet, cyan, and lighter shades of blue. In some configurations, a solution for the lack of transmittance of the color purple is to install a thin sprayed layer filter that would be able to enhance, specifically, the color violet. With this piece of technology, in conjunction with an image sensor and an algorithm to regulate the white balance and saturation, it is possible to produce a functioning metalens operates across the entire visible spectrum range.

In some configurations, the method of manufacture utilizes Reactive Ion Etching. The process involves an intricate process that requires reactive gases and plasma to etch the structures on top of the surface. The process that goes into the Etching process include:

Substrate Preparation: Clean the substrate to remove any contaminants or particles that may interfere with the etching process. This may involve cleaning with solvents, rinsing with deionized water, and drying.

Load the Substrate: Place the prepared substrate onto the sample holder or chuck in the RIE chamber. Ensure proper alignment and fixation of the substrate.

Chamber Evacuation: Pump down the RIE chamber to a desired vacuum level. This step is necessary to create a low-pressure environment for the plasma generation.

Gas Introduction: Introduce the reactive gas or gas mixture into the chamber. The choice of gas depends on the specific material being etched. Common gases used in RIE include fluorine-based gases (e.g., $CF_4$, $SF_6$) or chlorine-based gases (e.g., $Cl_2$).

Plasma Generation: Apply a radio-frequency (RF) power supply to generate a plasma in the chamber. The plasma consists of ionized gas species and free radicals that will react with the substrate material.

Etching Process: Activate the RF power to energize the reactive gas ions and direct them towards the substrate. The reactive ions will chemically react with the substrate material, while the physical bombardment of ions will physically sputter away the material.

Etch Rate Control: Adjust the process parameters, such as gas flow rate, pressure, power, and etch time, to control the etch rate and selectivity of the process. Selectivity determines the etch rate ratio between the target material and the mask material.

Endpoint Detection: Monitor the etching process to determine the endpoint accurately. This can be done by various methods, such as optical emission spectroscopy or real-time monitoring of process parameters.

Chamber Venting: Once the etching process is complete, vent the chamber to atmospheric pressure.

Substrate Removal: Remove the substrate from the RIE chamber and proceed with any necessary post-etch cleaning or further processing steps.

In some configurations, the method of manufacture involves utilizing a laser to carve the nanostructures on top of the chosen material. Manufacturing using lasers may be sub-categorized into two distinctive methods, a continuous beam, a pulse laser, and/or other techniques. A pulse laser, unlike a continuous laser, is a laser that emits light in form of pulses instead of a beam. The pulse laser omits a high intensity beam that in short durations. A notable feature of the pulse laser is that it dissipates energy in bursts ranging from nanoseconds to as fast as femtoseconds. The continuous beam is a method that involves omitting light at a high intensity within a continuous amount of time. In some configurations, the pulse laser is better suited for the purpose of manufacturing a metalens, as it addresses concerns of saving power and time.

The Electron Lithography method is a process that utilizes a pulse laser and a patterned layer to carve out patterns on top of a surface, whilst simultaneously moving the material. Essentially small, incremented movements on a nanoscale would be done to the material as the pattern layer is exposed to a high energy level light beam to carve out each individual structure according to the set parameters of dimensions and proximity between said structures. The full process is listed as below:

Substrate Preparation: The substrate, such as a silicon wafer or glass slide, is cleaned and prepared to ensure a clean surface for the deposition of the resist material.

Resist Deposition: A resist material is deposited onto the substrate using techniques like spin coating, vapor deposition, or chemical vapor deposition. The resist serves as a layer that will be patterned by the electron beam.

Alignment and Calibration: The substrate is aligned and positioned accurately within the electron lithography system. Calibration steps are performed to ensure the correct alignment of the electron beam and the substrate.

Electron Beam Exposure: The resist-coated substrate is exposed to the electron beam. The electron beam is generated, controlled, and deflected using electromagnetic lenses, magnetic coils, and electrostatic plates. The beam scans across the substrate in a specific pattern defined by the desired design.

Dose Control: During exposure, the dose of electrons received by the resist material is carefully controlled. The dose is determined by factors such as the beam current, dwell time, and scanning speed. This control ensures the proper level of exposure for the desired pattern.

Development: After exposure, the resist-coated substrate undergoes a development process. This process removes either the exposed or unexposed regions of the resist, depending on whether a positive or negative resist was used. The development step reveals the patterned resist.

Etching or Imprinting: If the resist pattern is intended to be transferred to the underlying substrate, an etching or imprinting step may be performed. This step involves selectively removing or modifying the substrate material according to the pattern defined by the resist.

Resist Removal: Once the pattern transfer is complete, the remaining resist material is typically removed from the substrate. This can be done using chemical solvents, plasma etching, or other appropriate techniques.

Post-processing: Additional post-processing steps, such as deposition, annealing, or cleaning, may be performed to complete the fabrication process and prepare the substrate for further integration or device assembly.

One particular laser-based process that would be suitable in some configurations for manufacturing a metalens is the Laser Induced Forward Transfer process, also known as LIFT.

The Laser-Induced Forward Transfer (LIFT) process transfers the donor material to the receiving material and is able to replicate the donor material's features. LIFT involves the transfer of material from a donor substrate to another material using a pulse laser. In certain cases, both the donor material and the receiving material may be of a similar nature or even the same. Another key feature that is of significance is the fact that the pulse laser omits a higher intensity of beams in short bursts than that of a continuous beam, saving costs on power and speed. Concerns such as heat accumulation, efficiency of material interaction, and material processing may be significantly diminished with the use of pulse lasers as the intensity is controlled through spaced out bursts and the dissipation of high peak power levels allowing for a significantly more efficient interactions between materials thus creating well shaped and accurate structures. The LIFT process involves the following steps:

Donor Substrate Preparation: The donor substrate is prepared by depositing or patterning the material that will be transferred. The material can be a thin film, a microstructure, or a nanostructure, depending on the desired application.

Receiving Substrate Preparation: The receiving substrate, where the transferred material will be deposited, is prepared accordingly. It is typically cleaned and positioned in close proximity to the donor substrate.

Laser Irradiation: A pulsed laser, such as an excimer laser or a femtosecond laser, is directed onto the donor substrate. The laser pulse is focused onto a specific spot on the donor substrate where the transfer will occur. The laser parameters, such as pulse duration, energy, and spot size, are carefully controlled to achieve the desired transfer.

Material Transfer: When the laser pulse strikes the donor substrate, it generates a high-pressure plasma at the interface between the laser-irradiated region and the material to be transferred. This plasma acts as a propellant that drives the material forward toward the receiving substrate.

Material Deposition: The material is propelled toward the receiving substrate and deposits onto its surface. The material transfer occurs in a forward direction, perpendicular to the laser incidence, hence the name "forward transfer."

Pattern Formation: The material that is transferred can form a desired pattern or structure on the receiving substrate, replicating the features of the donor substrate. The pattern fidelity depends on the resolution and precision of the laser irradiation and the quality of the donor material.

There are advantages to each of the techniques. The pulse laser is able to dissipate more power and manufacture at a high rate of speed. However, when fabricating structures at smaller scales such as Nano, pulse laser techniques may require modification. Pulse laser techniques are able to operate in a nanoscale but would guarantee a higher efficiency and accuracy when operating at a microscale.

Figure 9:
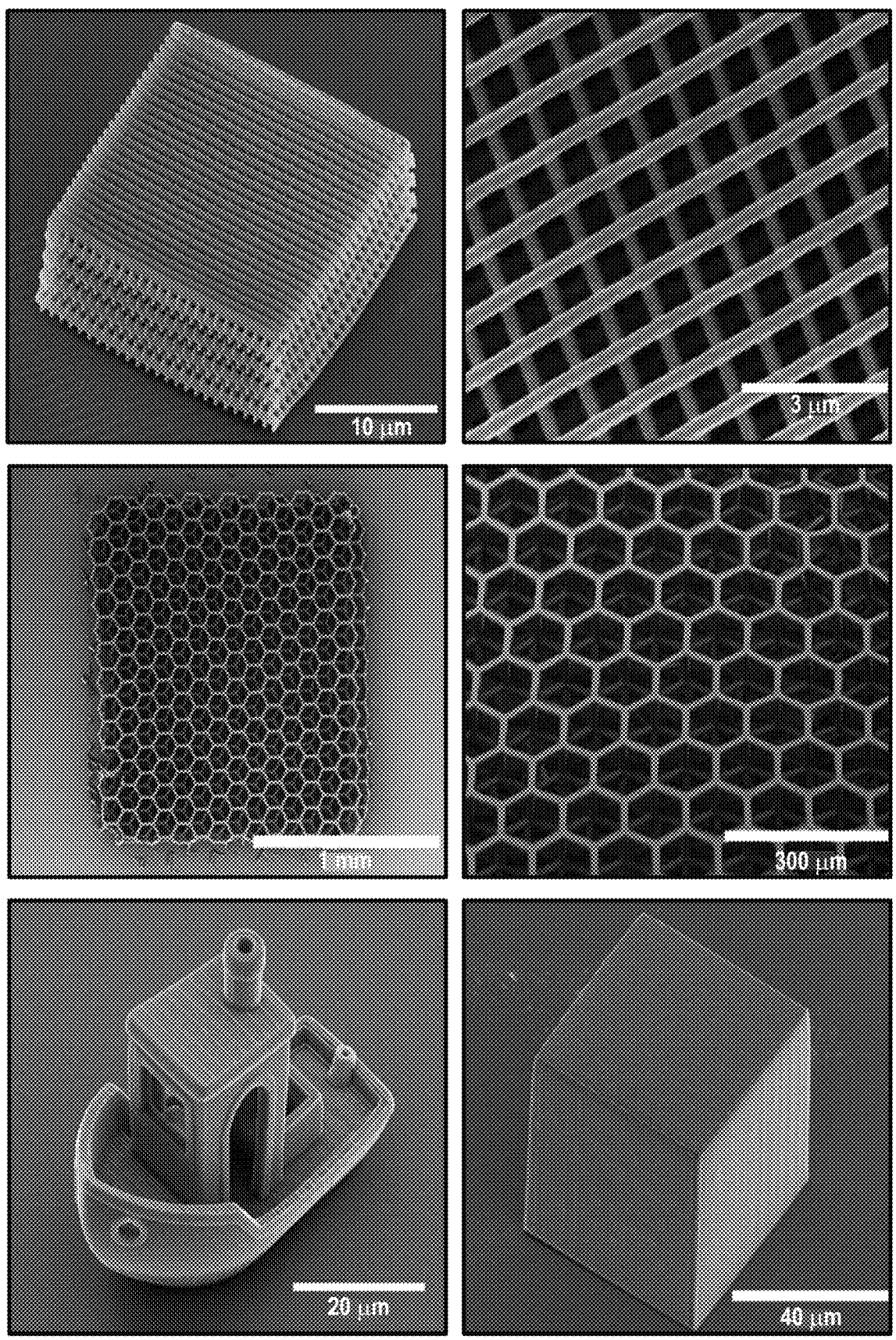
FIG. 9 illustrates exemplary nanostructures manufactured using Direct Laser Writing.

Another particular laser-based process that would be suitable in some configurations for manufacturing a metalens is the Direct Laser Writing process, also known as DLW. Direct Laser Writing pulse laser technology may produce complex nanostructures in a matter of seconds to minutes. FIG. 9 shows some examples of the structures achieved.

The proposed pyramid structure design of some configurations above, may be less complicated and bigger than some of the nanostructures that may be achieved through DLW laser manufacturing.

Further configurations are provided by the subject matter of the following clauses.

According to some configurations, a lens for manipulating electromagnetic waves includes a substrate and a first zone on a surface of the substrate, the first zone being configured to manipulate a first wavelength range. The first zone may include a first group of pyramid structures each having a first set of dimensions that are defined based on the first wavelength range.

In some configurations, the first zone is a first annular region on the surface of the substrate and the first zone has a first radius and a first thickness.

In some configurations, the first group of pyramid structures are positioned within the first zone in a repeating pattern, and the minimum distance between pyramid structures in the first zone is a minimum wavelength of the first wavelength range.

In some configurations, each pyramid structure includes a first lower base proximate to the substrate and a first upper base above the substrate, and the first set of dimensions include a first lower base width, a first lower base length, a first upper base width, a first upper base length, and a first height.

In some configurations, the repeating pattern includes a repeating unit of two or more pyramid structures. In some such configurations, the repeating unit includes five pyramid structures arranged within a square, wherein one pyramid structure is positioned at each of four corners of the square, and one pyramid structure is arranged at the center of the square.

In some configurations, the lens includes a second zone on the surface of the substrate, the second zone being configured to manipulate a second wavelength range. The second zone may include a second group of pyramid structures each having a second set of dimensions that are defined by the second wavelength range.

In some configurations, the second group of pyramid structures are positioned within the second zone in the repeating pattern. The minimum distance between pyramid structures in the second zone may be a minimum wavelength of the second wavelength range.

In some configurations, each pyramid structure in the second group of pyramid structures includes a lower base proximate to the substrate and an upper base above the substrate, and the second set of dimensions include a second lower base width, a second lower base length, a second upper base width, a second upper base length, and a second height.

In some configurations, the lens is configured as a beam splitter for wavelengths in the second wavelength range.

In some configurations, the second zone is a second annular region on the surface of the substrate, the second zone has a second radius and a second thickness, and the first zone and the second zone are concentric zones.

In some configurations, the first wavelength range has a minimum wavelength greater than or equal to 380 nanometers and a maximum wavelength less than or equal to 750 nanometers.

In some configurations, the first wavelength range has a minimum wavelength greater than or equal to 450 nanometers and a maximum wavelength less than or equal to 485 nanometers.

In some configurations, the first wavelength range has a minimum wavelength greater than or equal to 500 nanometers and a maximum wavelength less than or equal to 550 nanometers.

In some configurations, the first wavelength range has a minimum wavelength greater than or equal to 380 nanometers and a maximum wavelength less than or equal to 420 nanometers.

In some configurations, the first wavelength range has a minimum wavelength greater than or equal to 500 nanometers and a maximum wavelength less than or equal to 700 nanometers.

In some configurations, the first wavelength range has a minimum wavelength greater than or equal to 400 nanometers and a maximum wavelength less than or equal to 480 nanometers.

In some configurations, the lens includes a filter layer applied to the surface of the substrate, said filter layer configured to increase transmittance for wavelengths between 400 nanometers and 480 nanometers. In some such configurations, the filter layer is applied to the surface of the pyramid structures in the first zone.

In some configurations, the lens has a transmittance ratio greater than or equal to 98%.

In some configurations, the lens is at least partially composed of borosilicate glass.

In some configurations, the lens includes an anti-reflective coating applied to the surface of the substrate.

In some configurations, the lens is configured as a beam splitter for wavelengths in the first wavelength range.

Use of language such as "at least one of X, Y, and Z," "at least one of X, Y, or Z," "at least one or more of X, Y, and Z," "at least one or more of X, Y, or Z," "at least one or more of X, Y, and/or Z," or "at least one of X, Y, and/or Z," are intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

The configurations illustrated and discussed in this specification are intended only to teach those skilled in the art how to make and use the technology related to the disclosure. In describing configurations described herein, specific terminology is employed for the sake of clarity. However, the claims are not to be limited to the specific terminology so selected. The above-described configurations described herein may be modified or varied, without departing from the scope of the claims, as appreciated by those skilled in the art in light of the above teachings. It is therefore to be understood that, within the scope of the claims and their equivalents, particular configurations may be practiced otherwise than as specifically described. For example, it is to be understood that the present disclosure contemplates that, to the extent possible, one or more features of any embodiment can be combined with one or more features of any other embodiment.

Further aspects of the present disclosure are provided by the subject matter of the following clauses.

A lens for manipulating electromagnetic waves comprising: a substrate; and a first zone on a surface of the substrate, the first zone being configured to manipulate a first wavelength range, wherein the first zone comprises at least one Frustrum cut pyramid structure each having a first set of dimensions that are defined based on the first wavelength range.

The lens of any previous clause, wherein the first zone is a first annular region on the surface of the substrate and the first zone has a first radius and a first thickness.

The lens of any previous clause, wherein each pyramid structure in the at least one Frustrum cut pyramid structure comprises: a first lower base proximate to the substrate; and a first upper base above the substrate, and wherein the first set of dimensions include a first lower base width, a first lower base length, a first upper base width, a first upper base length, and a first height.

The lens of any previous clause, wherein, the at least one Frustrum cut pyramid structure is positioned within the first zone in a repeating pattern, and a minimum distance between Frustrum cut pyramid structures in the first zone is a minimum wavelength of the first wavelength range.

The lens of any previous clause, wherein the repeating pattern includes a repeating unit of two or more pyramid structures.

The lens of any previous clause, wherein the repeating pattern comprises five Frustrum cut pyramid structures arranged within a square, wherein one Frustrum cut pyramid structure is positioned at each of four corners of the square, and one Frustrum pyramid structure is arranged at the center of the square.

The lens of any previous clause, further comprising a second zone on the surface of the substrate, the second zone being configured to manipulate a second wavelength range distinct from the first wavelength range.

The lens of any previous clause, wherein the second zone comprises a second group of Frustrum cut pyramid structures each having a second set of dimensions that are defined by the second wavelength range, the second set of dimensions having distinct values than the first set of dimensions.

The lens of any previous clause, wherein the second group of Frustrum cut pyramid structures are positioned within the second zone in the repeating pattern.

The lens of any previous clause, wherein a minimum distance between Frustrum cut pyramid structures in the second zone is a minimum wavelength of the second wavelength range.

The lens of any previous clause, wherein each Frustrum cut pyramid structure in the second group of Frustrum cut pyramid structures comprises a lower base proximate to the substrate and an upper base above the substrate, and the second set of dimensions comprise a second lower base width, a second lower base length, a second upper base width, a second upper base length, and a second height.

The lens of any previous clause, wherein the lens is configured as a beam splitter for wavelengths in the second wavelength range.

The lens of any previous clause, wherein the second zone is a second annular region on the surface of the substrate, the second zone has a second radius and a second thickness, and the first zone and the second zone are concentric zones.

The lens of any previous clause, wherein the first wavelength range has a minimum wavelength greater than or equal to 380 nanometers and a maximum wavelength less than or equal to 750 nanometers.

The lens of any previous clause, wherein the first wavelength range has a minimum wavelength greater than or equal to 450 nanometers and a maximum wavelength less than or equal to 485 nanometers.

The lens of any previous clause, wherein the first wavelength range has a minimum wavelength greater than or equal to 500 nanometers and a maximum wavelength less than or equal to 550 nanometers.

The lens of any previous clause, wherein the first wavelength range has a minimum wavelength greater than or equal to 380 nanometers and a maximum wavelength less than or equal to 420 nanometers.

The lens of any previous clause, wherein the lens has a transmittance ratio greater than or equal to 98%.

The lens of any previous clause, wherein the lens is at least partially composed of borosilicate glass.

The lens of any previous clause, wherein the lens comprises an anti-reflective coating applied to a surface of the substrate.

We claim:

1. A lens for manipulating electromagnetic waves comprising:
   a substrate;
   a first zone on a surface of the substrate, the first zone being configured to manipulate a first wavelength range, wherein the first zone comprises at least one Frustrum cut pyramid structure each having a first set of dimensions that are defined based on the first wavelength range
   wherein, the at least one Frustrum cut pyramid structure is positioned within the first zone in a repeating pattern, and a minimum distance between Frustrum cut pyramid structures in the first zone is a minimum wavelength of the first wavelength range; and
   a second zone on the surface of the substrate, the second zone being configured to manipulate a second wavelength range distinct from the first wavelength range.

2. The lens of claim 1, wherein the first zone is a first annular region on the surface of the substrate and the first zone has a first radius and a first thickness.

3. The lens of claim 1, wherein each pyramid structure in the at least one Frustrum cut pyramid structure comprises:
   a first lower base proximate to the substrate; and
   a first upper base above the substrate, and
   wherein the first set of dimensions include a first lower base width, a first lower base length, a first upper base width, a first upper base length, and a first height.

4. The lens of claim 1, wherein the repeating pattern includes a repeating unit of two or more pyramid structures.

5. The lens of claim 1, wherein the repeating pattern comprises five Frustrum cut pyramid structures arranged within a square, wherein one Frustrum cut pyramid structure is positioned at each of four corners of the square, and one Frustrum pyramid structure is arranged at the center of the square.

6. The lens of claim 1, wherein the lens is configured as a beam splitter for wavelengths in the second wavelength range.

7. The lens of claim 1, wherein the second zone is a second annular region on the surface of the substrate, the second zone has a second radius and a second thickness, and the first zone and the second zone are concentric zones.

8. The lens of claim 1, wherein the first wavelength range has a minimum wavelength greater than or equal to 380 nanometers and a maximum wavelength less than or equal to 750 nanometers.

9. The lens of claim 1, wherein the first wavelength range has a minimum wavelength greater than or equal to 450 nanometers and a maximum wavelength less than or equal to 485 nanometers.

10. The lens of claim 1, wherein the first wavelength range has a minimum wavelength greater than or equal to 500 nanometers and a maximum wavelength less than or equal to 550 nanometers.

11. The lens of claim 1, wherein the first wavelength range has a minimum wavelength greater than or equal to 380 nanometers and a maximum wavelength less than or equal to 420 nanometers.

12. The lens of claim 1, wherein the lens has a transmittance ratio greater than or equal to 98%.

13. The lens of claim 1, wherein the lens is at least partially composed of borosilicate glass.

14. The lens of claim 1, wherein the lens comprises an anti-reflective coating applied to a surface of the substrate.

15. The lens of claim 1, wherein the second zone comprises a second group of Frustrum cut pyramid structures each having a second set of dimensions that are defined by the second wavelength range, the second set of dimensions having distinct values than the first set of dimensions.

16. The lens of claim 15, wherein the second group of Frustrum cut pyramid structures are positioned within the second zone in the repeating pattern.

17. The lens of claim 16, wherein a minimum distance between Frustrum cut pyramid structures in the second zone is a minimum wavelength of the second wavelength range.

18. The lens of claim 17, wherein each Frustrum cut pyramid structure in the second group of Frustrum cut pyramid structures comprises a lower base proximate to the substrate and an upper base above the substrate, and the second set of dimensions comprise a second lower base width, a second lower base length, a second upper base width, a second upper base length, and a second height.

\* \* \* \* \*